Jan. 7, 1936.  M. MOSTKOFF  2,027,056
AUTOMOBILE TIRE
Filed Aug. 27, 1934
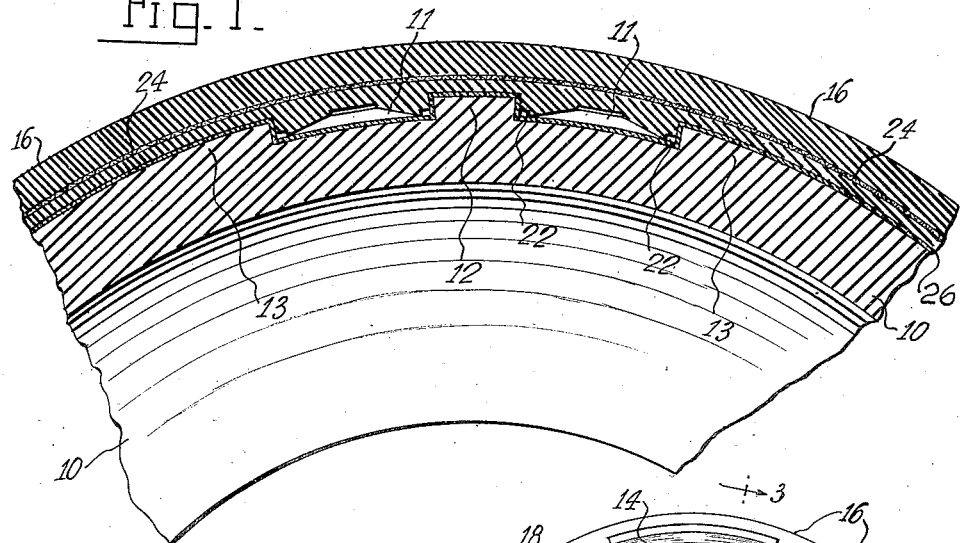
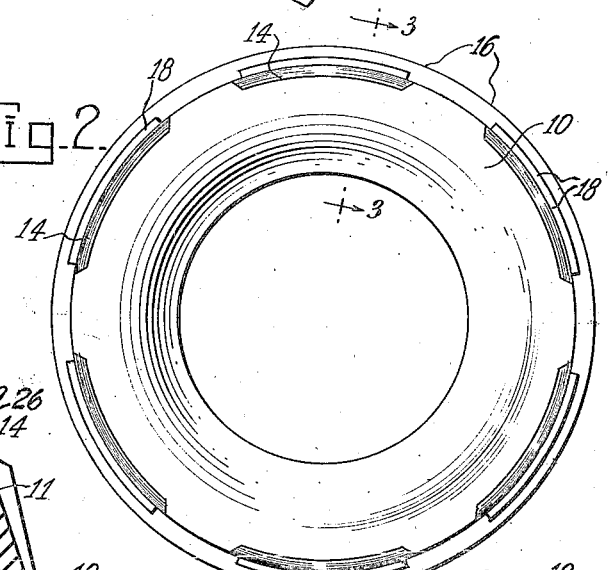
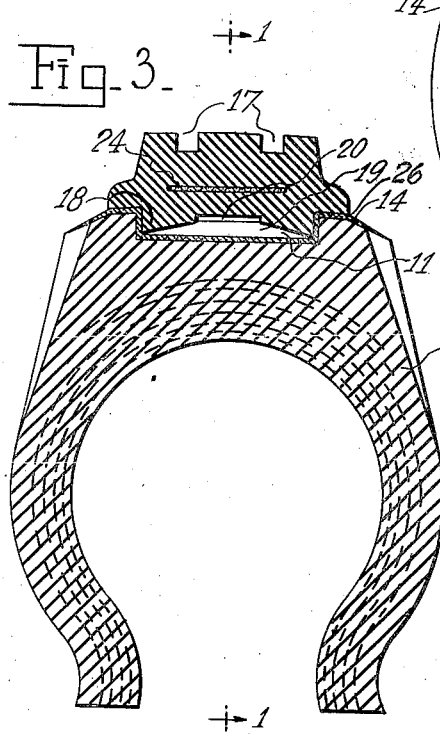
Inventor
Morris Mostkoff.
By his Attorney Patented Jan. 7, 1936

2,027,056

UNITED STATES PATENT OFFICE 2,027,056

AUTOMOBILE TIRE

Morris Mostkoff, New York, N. Y.

Application August 27, 1934, Serial No. 741,648

1 Claim. (Cl. 152—17)

The main object of this invention is the provision of an improved automobile tire construction whereby the life of the tire is greatly increased, the riding qualities are enhanced, and the liability to puncture is greatly reduced.

Another object of the invention is the provision of a separate rubber tread which is firmly attached to the peripheral body of the tire and which, when worn out, can be readily and simply replaced by a new tread.

The life of the tires in common use ceases when the tread is worn away, and the tire must then be scrapped, although at such time the body of the tire remains perfectly sound and is capable of continuing in use for a period of time three or more times as long as the period during which the tread has been worn away.

The above and other objects will become apparent in the description below, in which characters of reference refer to like-named parts in the accompanying drawing.

Referring briefly to the drawing, Figure 1 is an enlarged longitudinal cross-sectional view through a portion of the tire embodying this invention, taken on the line 1—1 of Figure 3.

Figure 2 is a side view of the complete tire.

Figure 3 is an enlarged cross-sectional view taken on the line 3—3 of Figure 2.

Figure 4 is an underside plan view of a section of the replaceable tread.

Referring in detail to the drawing, the numeral 10 represents the body of the tire. At spaced apart intervals along the periphery of the body 10, square cut-outs 11 are provided, separated from each other by risers 12 and 13. The risers 12 are narrower than the risers 13, so that the cutouts 11 are arranged in spaced-apart pairs around the periphery of the body. The rubber wall of the body 10 is built up along each peripheral section on each side of each pair of cutouts 11 to provide a reinforcing ledge 14.

The replaceable tread comprises a plurality of arcuate sections 25, all of which are identical to each other and are united to form a unitary peripheral band 16 of rubber. On the outside each section is provided with any suitable grooving 17. A square projection 18 extends downward from one end of the inside of the section 16, and this projection is cupped out to provide a suction cup 19 having a cylindrical extension 20 at the base of the cup. The conical side of the suction cup 19 is provided with a raised lip 21, thus providing a peripheral air space 22 around the lip 21 between the floor and walls of the cut-out 11 when the tread is mounted on the body. Each section 25 is provided with a wing 23 on each side of the suction cup end, which wing lies in contact with the ledge 14 on the body of the tire, when the tread is mounted.

The entire periphery of the tire body 10 is coated with a layer of soft rubber 26.

In assembling the tread on the tire body, the periphery of the latter with the exception of the cut-outs 11, is first covered with a layer of rubber cement, not shown. The tread or band 16 is then mounted by forcing each square projection 18 down into its appropriate square cut-out 11, thus causing a tight suction engagement between the tread and the body, in addition to the cement binding between the tread and the body. The tread sections 25 are arranged in pairs, the sections of each pair extending in opposite directions to each other.

A reinforcing means for the tread may be provided in the form of a fabric band 24 extending within the band 25, which is also secured in the tread with rubber cement.

It is apparent that a tire constructed as above-described, will outlast three or more of the usual tires at a considerable less cost than three of the usual tires. When the tread of this tire has been worn away, the remainders of the old tread are pulled out, and a new tread is substituted, in the manner above set forth.

Obviously, modifications in form and structure may be made without departing from the spirit of the invention.

I claim:

An automobile tire comprising a body member and a unitary peripheral tread adapted to be mounted on said body member, the periphery of said body member being provided with spaced-apart cut-out substantially square in outline and arranged in adjacent pairs about said periphery, said tread members having inward projections of similar outline registering in said cut-outs, each of said projections being provided with a conical suction cup to enhance the gripping contact between the floors of said cut-outs and said projections and at the same time to provide air cushions between said members, each of said suction cups having a circular peripheral lip enclosing an air space between said lip and the walls of the cut-out.

MORRIS MOSTKOFF.